United States Patent
Abramson et al.

(10) Patent No.: US 8,619,956 B2
(45) Date of Patent: *Dec. 31, 2013

(54) PRIVATE-BRANCH EXCHANGE THAT PROVIDES CALL BRIDGING TO AN OFF-PREMISES TERMINAL IN THE PRESENCE OF A THIRD-PARTY APPLICATION

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1823 days.

This patent is subject to a terminal disclaimer.

(21) Appl. No.: 11/671,444

(22) Filed: Feb. 5, 2007

(65) Prior Publication Data

US 2008/0187124 A1    Aug. 7, 2008

(51) Int. Cl.
    *H04M 1/56*    (2006.01)
(52) U.S. Cl.
    USPC ............ 379/142.01; 379/211.02; 379/212.01; 455/555; 455/554.1
(58) Field of Classification Search
    USPC ........... 379/142.01, 211.02, 212.01; 455/555, 455/554.1
    See application file for complete search history.

(56) References Cited

U.S. PATENT DOCUMENTS

| | | |
|---|---|---|
| 5,454,033 A | 9/1995 | Hahn et al. |
| 5,502,762 A | 3/1996 | Andrew et al. |
| 5,875,234 A | 2/1999 | Clayton et al. |
| 5,991,390 A | 11/1999 | Booton |
| 6,038,302 A | 3/2000 | Burak et al. |
| 6,061,438 A | 5/2000 | Shen et al. |
| 6,950,507 B1 | 9/2005 | Kaplan |
| 6,993,360 B2 * | 1/2006 | Plahte et al. .................. 455/555 |
| 7,319,864 B2 | 1/2008 | Jagadeesan et al. |
| 7,920,685 B2 | 4/2011 | Abramson et al. |

(Continued)

FOREIGN PATENT DOCUMENTS

| | | |
|---|---|---|
| DE | 102007056793 A1 | 7/2008 |
| EP | 1679870 A3 | 7/2006 |

(Continued)

OTHER PUBLICATIONS

Stokes, Jared, "International Application No. 0802122 Office Action May 13, 2009", Publisher: UK IPO, Published in: GB.

(Continued)

*Primary Examiner* — Quynh Nguyen
(74) *Attorney, Agent, or Firm* — Kacvinsky Daisak PLLC; John Maldjian, Esq.; Alexander D. Walter, Esq.

(57) ABSTRACT

A telecommunications system is disclosed that enables a user to pair a desk set that is an extension of a private-branch exchange with a cell phone that is accessible via the Public Switched Telephone Network. One feature of the telecommunications system enables an active call that is between the desk set and another party, to be transferred to the user's cell phone, while in the presence of third-party call control. This is advantageous because a user who is initially on a call at her desk set, but needs to get somewhere else (e.g., a meeting, the airport, home, etc.), is able to continue the call by transferring it to her cell phone. The third-party call control can be part of a computer-telephony integration (CTI) application—for example, in a telephone telemarketing center, which concurrently handles many active telephone calls.

11 Claims, 13 Drawing Sheets

(56) References Cited

U.S. PATENT DOCUMENTS

| | | | |
|---|---|---|---|
| 8,160,228 B2 | 4/2012 | Abramson et al. | |
| 2003/0185375 A1 | 10/2003 | Albal | |
| 2004/0179660 A1 | 9/2004 | Sammon et al. | |
| 2004/0209640 A1 | 10/2004 | Urban et al. | |
| 2004/0234063 A1 | 11/2004 | Milton et al. | |
| 2006/0285671 A1* | 12/2006 | Tiruthani et al. | 379/202.01 |

FOREIGN PATENT DOCUMENTS

| | | | |
|---|---|---|---|
| EP | 1 814 295 A1 | 8/2007 | |
| EP | 1814295 A1 | 8/2007 | |
| GB | 2422510 A | 7/2006 | |
| GB | 2446308 A | 8/2008 | |
| WO | 97/34437 A1 | 9/1997 | |
| WO | 9734437 A1 | 9/1997 | |
| WO | 00/59190 A1 | 10/2000 | |
| WO | 0059190 A1 | 10/2000 | |
| WO | 01/35616 A2 | 5/2001 | |
| WO | 0135620 A1 | 5/2001 | |
| WO | 2006055221 A2 | 5/2006 | |
| WO | 2007109343 A3 | 9/2007 | |

OTHER PUBLICATIONS

Stokes, Jared, "International Application No. 0802122 Search Report May 27, 2008", Publisher: GB, Published in: GB.
Rampersad, Vedesh, "U.S. Appl. No. 11/671,441 Office Action Oct. 6, 2010", Publisher: USPTO, Published in: US.
Jared Stokes, "GB Application No: 0802122.2 Cobined Search and Examination Report", May 27, 2008, Publisher: UK Intellectual Property Office, Published in: GB.
Stokes, Jared, "GB Application No. GB0802123.0 Examination Report Oct. 14, 2009", Publisher: UK IPO, Published in: GB.
Stokes, Jared, "GB Application No. GB0802124.8 Examination Report Oct. 13, 2009", Publisher: UK IPO, Published in: GB.
Stokes, Jared, "GB Application No. GB0802122.2 Examination Report Oct. 12, 2009", Publisher: UK IPO, Published in: GB.
Stokes, Jared, "GB Application No. GB0802122.2 Office Action Jan. 18, 2010", Publisher: UK IPO, Published in: GB.
Le, Karen L., "U.S. Appl. No. 11/671,442 Office Action Nov. 26, 2010", Publisher: USPTO, Published in: US.
Great Britain Application No. 0802122.2, Examination Report dated May 13, 2009, 2 pages.
"GB Application No. GB0802123.0, Combined Search and Examination Report dated May 1, 2008," Avaya Technology LLC, 8 pages.
"GB Application No. GB0802122.2, Office Action dated May 13, 2009", Avaya Inc, 2 pages.
Le, Karen L., "U.S. Appl. No. 11/671,442 Office Action dated Nov. 26, 2010," Publisher: USPTO, Published in: US, 11 pages.
Stokes, Jared, "GB Application No. GB0802124.8 Combined Search and Examiners Report dated Apr. 28, 2008," Published in: GB, 5 pages.
Stokes, Jared, "GB Application No. GB0802123.0 Office Action dated May 15, 2009," Publisher: UK IPO, Published in: GB, 2 pages.
Stokes, Jared, "International Application No. GB0802124.8 Office Action dated May 15, 2009," Published in: GB, 2 pages.

* cited by examiner

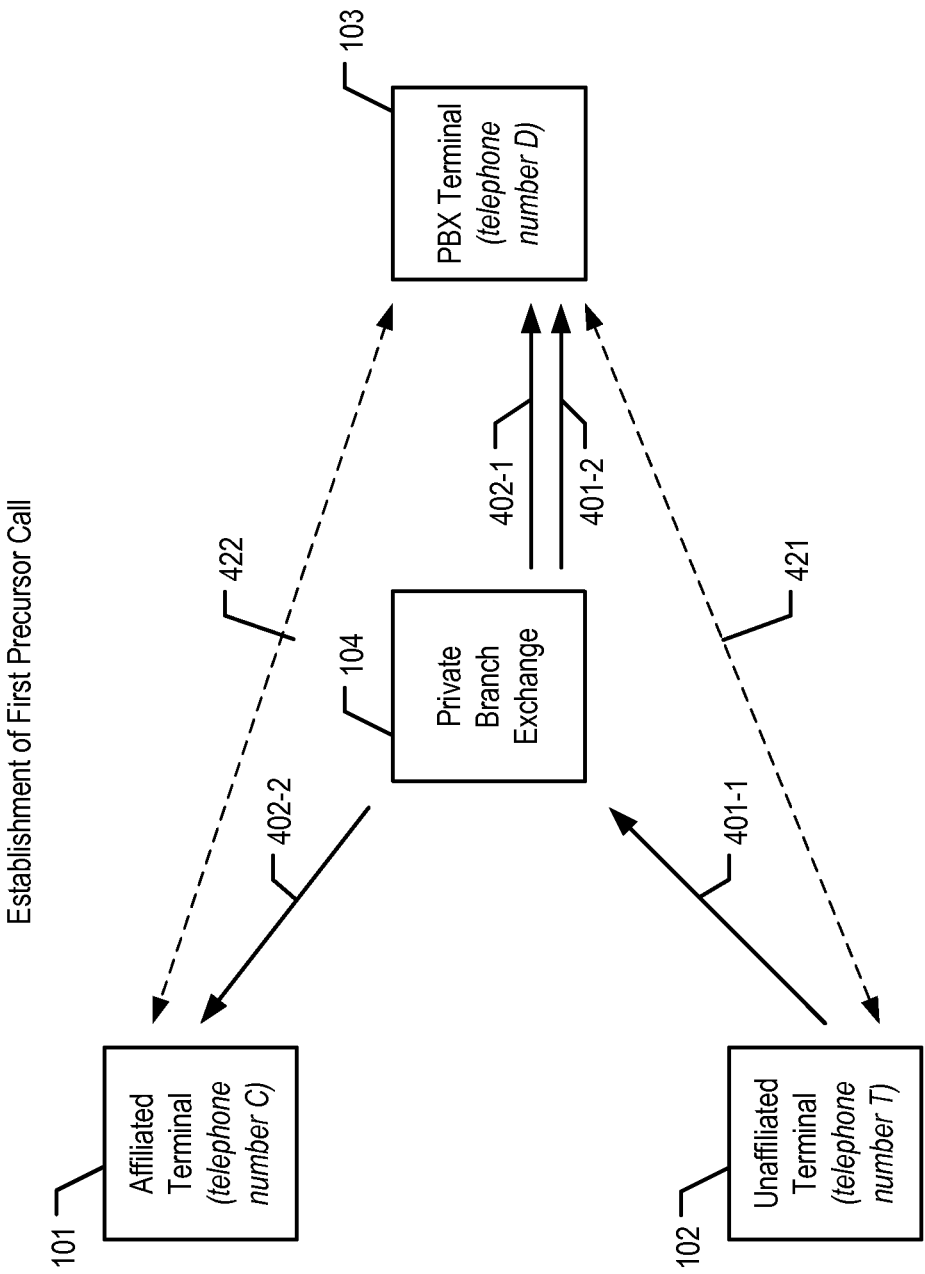

PRIVATE-BRANCH EXCHANGE THAT PROVIDES CALL BRIDGING TO AN OFF-PREMISES TERMINAL IN THE PRESENCE OF A THIRD-PARTY APPLICATION

FIELD OF THE INVENTION

The present invention relates to telecommunications in general, and, more particularly, to computer-telephony integration.

BACKGROUND OF THE INVENTION

A business that desires to provide employees at one location with telephones has, in general, two options. First, the business can acquire one telephone and one telephone line per employee from the telephone company. Second, the business can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." Private-branch exchanges are also capable of providing valuable telecommunications features to their users.

SUMMARY OF THE INVENTION

The present invention enables a valuable capability of a telecommunications system. In the prior art, one feature of a telecommunications system enables a user to pair a desk set that is an extension of a private-branch exchange with a cell phone that is accessible via the Public Switched Telephone Network. The feature enables an active call that is between the desk set and another party, to be transferred to the user's cell phone. This is advantageous because a user who is initially on a call at her desk set, but needs to get to somewhere else (e.g., a meeting, the airport, home, etc.) before the call is over, is able to continue the call by transferring it to her cell phone.

The illustrative embodiment of the present invention also provides the transfer feature, but does so when a third party serves as a front-end to the cell phone and, as such, acts as an agent to the cell phone in controlling calls to and from the cell phone. Such a third party includes a computer-telephony integration (CTI) application in a telephone telemarketing center, which concurrently handles many active telephone calls. Third-party CTI applications are often not inherently integrated with some or all of the features provided by the co-existing private-branch exchanges. The illustrative embodiment enables such CTI applications to interwork with legacy private branch exchanges or other equipment.

The illustrative embodiment comprises receiving a request to bridge an active call that exists between a telephone number D and a telephone number T, to a telephone number C; allocating, from a pool of ports, a port P that is capable of emulating a telephone extension; and establishing a resultant call between the telephone number T and the telephone number C, the resultant call being based on the active call and on at least one precursor call having been made that includes port P; wherein the telephone number C is associated with the telephone number D in a data structure and is within the address space of the Public Switched Telephone Network; and wherein the telephone number D is within the address space of a private-branch exchange.

BRIEF DESCRIPTION OF THE DRAWINGS

FIGS. 4a, 4b, 4c, and 4d depict graphs of the salient components of the precursor calls and resultant calls.

DETAILED DESCRIPTION

Telecommunications System 100—

Figure 1:
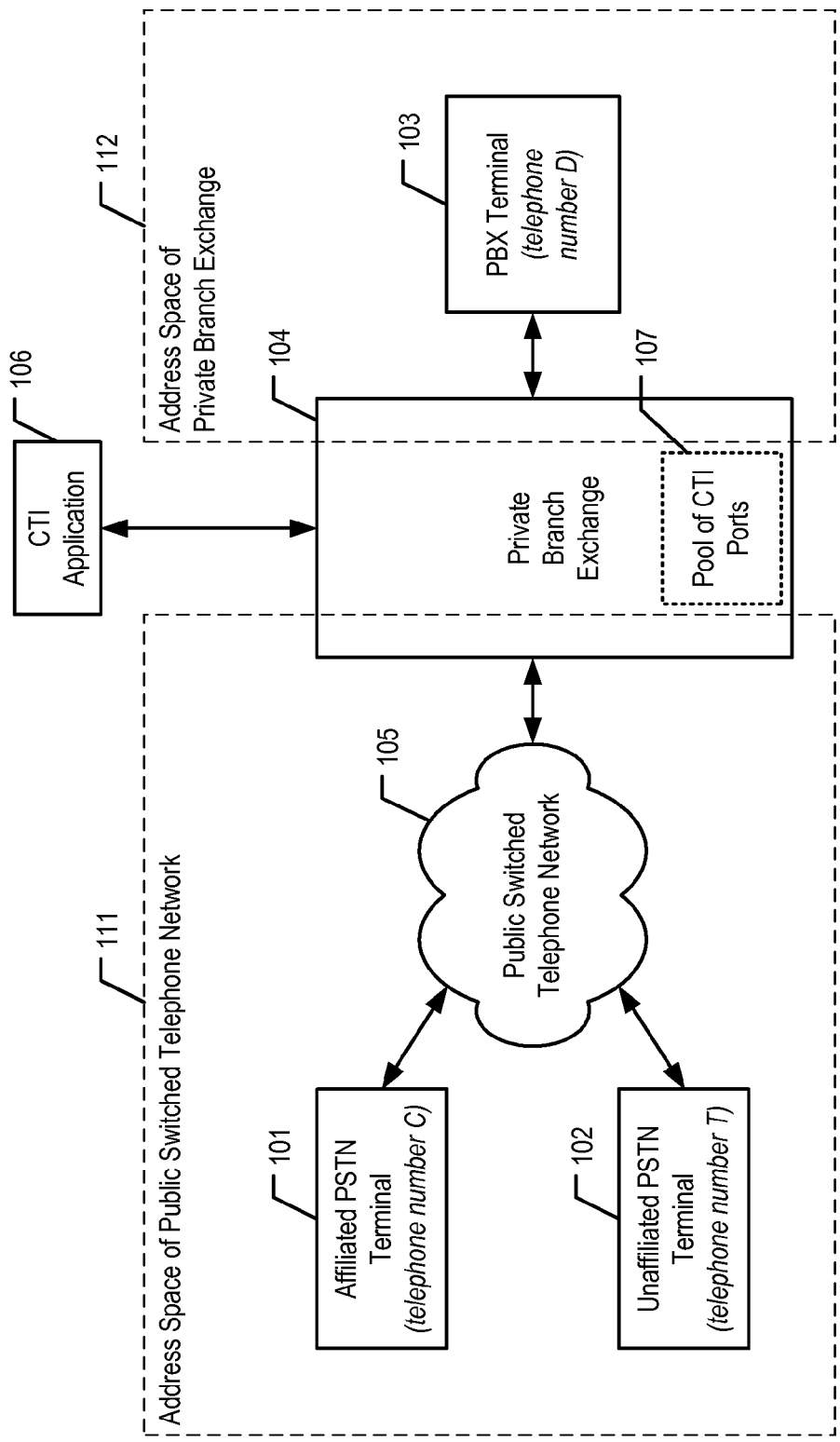
FIG. 1 depicts a schematic diagram of the salient components of telecommunications system 100 in accordance with the illustrative embodiment of the present invention.

FIG. 1 depicts a schematic diagram of the salient components of telecommunications system 100 in accordance with the illustrative embodiment of the present invention. Telecommunications system 100 comprises affiliated PSTN terminal 101, unaffiliated PSTN terminal 102, private-branch exchange (PBX) terminal 103, private-branch exchange (PBX) telephone system 104, Public Switched Telephone Network 105, and computer-telephony integration (CTI) application 106 interconnected as shown.

Although the illustrative embodiment comprises one affiliated PSTN telecommunications terminal, one unaffiliated PSTN telecommunications terminal, and one PBX telecommunications terminal, it will be clear to those skilled in the art, after reading this disclosure, how to make and use alternative embodiments of the present invention that comprise any number of affiliated PSTN telecommunications terminals, unaffiliated PSTN telecommunications terminals, and PBX telecommunications terminals.

Affiliated PSTN terminal 101 is a telecommunications terminal that corresponds to telephone number C in address space 111 of Public Switched Telephone Network 105. Terminal 101 is off-premises in relation to the on-premises enterprise region served by PBX telephone system 104. It will be clear to those skilled in the art, after reading this specification, how to make and use alternative embodiments of the present invention in which affiliated PSTN terminal 101 corresponds to a telephone number in the address space of a private branch exchange, such as, for example and without limitation, address space 112 of private branch exchange 104. In accordance with the illustrative embodiment, affiliated PSTN terminal 101 is a wireless terminal (e.g., cellular telephone, etc.). It will be clear to those skilled in the art, after reading this disclosure, how to make and use alternative embodiments of the present invention in which affiliated PSTN terminal 101 is a wireline terminal. It will be clear to those skilled in the art how make and use affiliated PSTN terminal 101.

Unaffiliated PSTN terminal 102 is a telecommunications terminal that corresponds to telephone number T in address space 111 of Public Switched Telephone Network 105. It will be clear to those skilled in the art, after reading this disclosure, how to make and use alternative embodiments of the present invention in which unaffiliated PSTN terminal 102 corresponds to a telephone number in the address space of a private branch exchange, such as, for example and without limitation, address space 112 of private branch exchange 104. In accordance with the illustrative embodiment, unaffiliated PSTN terminal 102 is a wireless terminal (e.g., cellular telephone, etc.). It will be clear to those skilled in the art, after reading this disclosure, how to make and use alternative embodiments of the present invention in which unaffiliated PSTN terminal 102 is a wireline terminal. It will be clear to those skilled in the art how to make and use unaffiliated PSTN terminal 102.

PBX terminal 103 is a telecommunications terminal that corresponds to telephone number D in address space 112 of private branch exchange 104. It will be clear to those skilled in the art, after reading this disclosure, how to make and use alternative embodiments of the present invention in which PBX terminal 103 corresponds to a telephone number in address space 111 of the Public Switched Telephone Network or the address space of another private branch exchange. In accordance with the illustrative embodiment, terminal 103 is a wireline terminal. It will be clear to those skilled in the art, after reading this disclosure, how to make and use alternative embodiments of the present invention in which terminal 103 is a wireless terminal. It will be clear to those skilled in the art how to make and use terminal 103.

Private-branch exchange 104 is a switch that provides telecommunications service to PBX terminal 103. Private branch exchange 104 comprises a data structure that associates the telephone number that corresponds to the PBX terminal 103 with the telephone number that corresponds to affiliated terminal 101. An example of such a data structure is depicted in Table 1.

TABLE 1

Data Structure That Associates the Telephone Number That Corresponds to PBX Terminal 103 with the Telephone Number That Corresponds to Affiliated Terminal 101

| Telephone Number That Corresponds to PBX Terminal 103 | Telephone Number That Corresponds to Affiliated Terminal 101 |
|---|---|
| D | C |

Although the illustrative embodiment associates one pair of telephone numbers, it will be clear to those skilled in the art, after reading this disclosure, how to make and use alternative embodiments of the present invention that associate any number of pairs.

Private-branch exchange 104 further comprises call-resource pool 107, which in turn comprises a plurality of CTI ports. It will be clear to those skilled in the art, after reading this disclosure, how to make and use embodiments of the present invention that comprise any number of CTI ports. Each port P is a logical point of connection that is capable of emulating a telephone extension, at least in the sense that within private-branch exchange 104, a call can be placed to a port, placed from a port, put on hold at a port, or transferred to or from a port. The particular telephone extension that a given port emulates might be known only to CTI application 106 and to private-branch exchange 104 itself, but not necessarily to any other device in system 100. At least one of CTI application 106 and private-branch exchange 104 is able to monitor the busy/idle status of each port P.

As those who are skilled in the art will appreciate, provisioning a greater number of ports will tend to result in a lower blocking level in the handling of calls, but can require additional resources with an associated additional cost. It will be clear to those skilled in the art how to determine an optimal provisioning of ports, for a given blocking level versus cost tradeoff. Additionally, it will be clear to those skilled in the art how to provision and administer the ports of pool 107.

In accordance with the illustrative embodiment, the operation of private-branch exchange 104 and PBX terminal 103 can be directed by computer-telephony integration application 106 in well-known fashion. The details of how to make and use private-branch exchange 104 are described in detail below and in the following drawings.

Public Switched Telephone Network 105 is the public telephone network. It will be clear to those skilled in the art how to make and use Public Switched Telephone Network 105.

Computer-telephony integration (CTI) application 106 is a combination of hardware and software that directs the operation of private-branch exchange 104 and PBX terminal 103. In particular, the CTI application provides the functionality described in detail below and in the accompanying figures. It will be clear to those skilled in the art, after reading this disclosure, how to make and use alternative embodiments of the present invention, in which CTI application 106 is absent and its functionality is performed by private-branch exchange 104 or by a natural person or by a combination of private-branch exchange 104 and by a natural person.

In accordance with the illustrative embodiment, CTI application 106 runs on an independent, general-purpose processor. It will be clear to those skilled in the art, after reading this disclosure, how to make and use alternative embodiments of the present invention in which CTI application 106 runs on an adjunct processor of private-branch exchange 104, a component of one or more of the terminals of telecommunication system 100, or on a special-purpose processor. The details of how to make and use CTI application 106 are described in detail below and in the following drawings.

Operation of the Illustrative Embodiment—

Figure 2:
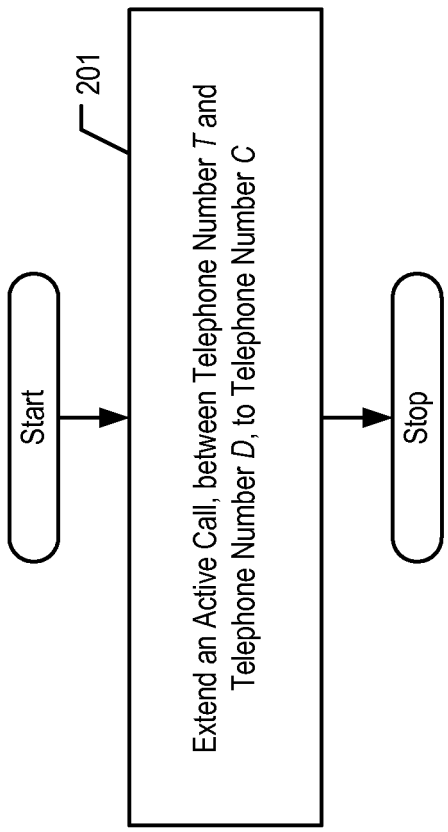
FIG. 2 depicts a flowchart of the salient task performed by the illustrative embodiment of the present invention.

FIG. 2 depicts a flowchart of the salient task performed by the illustrative embodiment of the present invention.

Task 201 comprises extending an active call that is between telephone number T to telephone number D, to telephone number C. The details of how to perform task 201 are described in detail below and with respect to the following drawings.

Establish Resultant Call—

Figure 3:
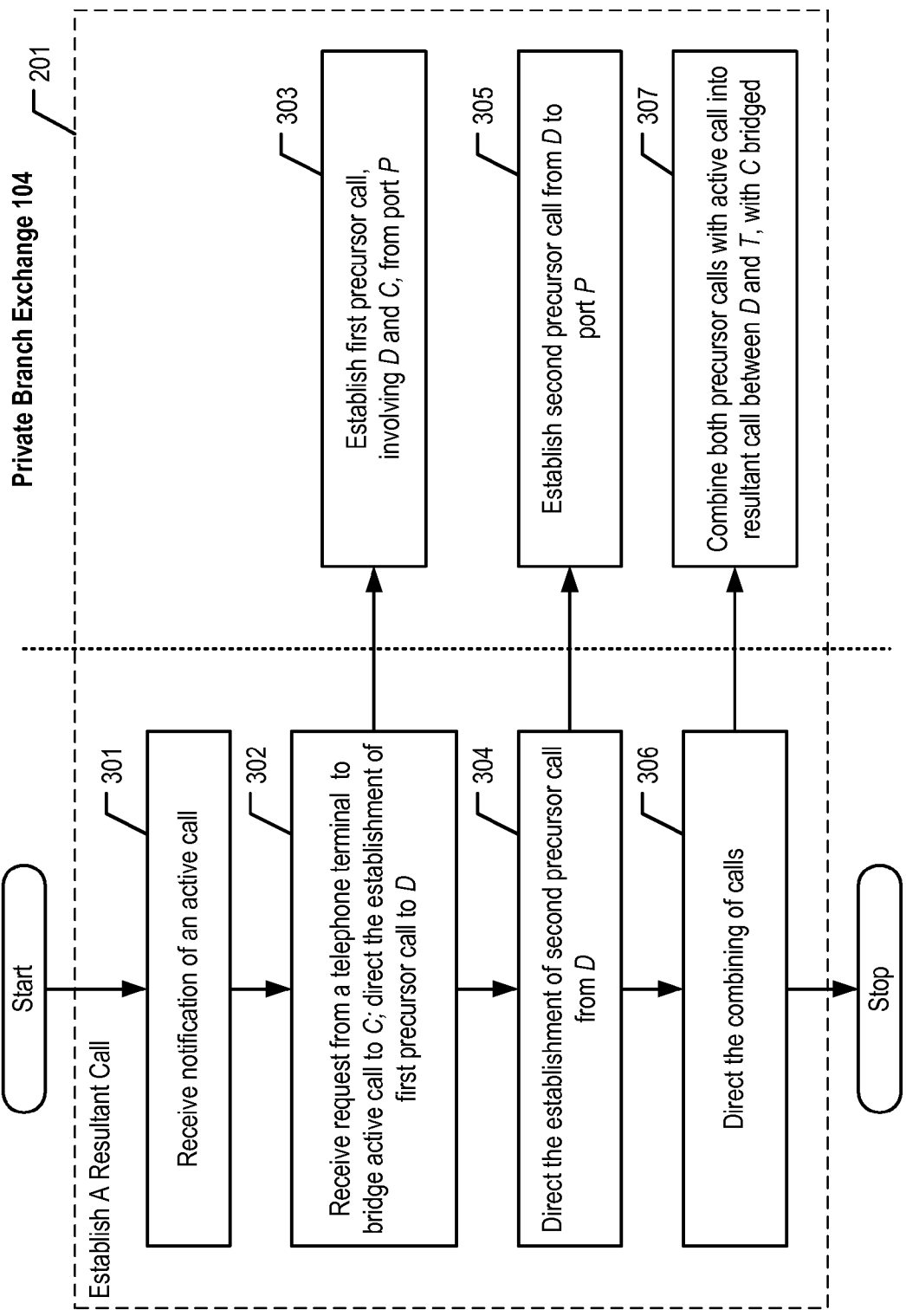
FIG. 3 depicts a flowchart of the salient tasks of task 201 in accordance with the illustrative embodiment of the present invention.

FIG. 3 depicts a flowchart of the salient tasks of task 201 in accordance with the illustrative embodiment of the present invention.

Figure 4A:
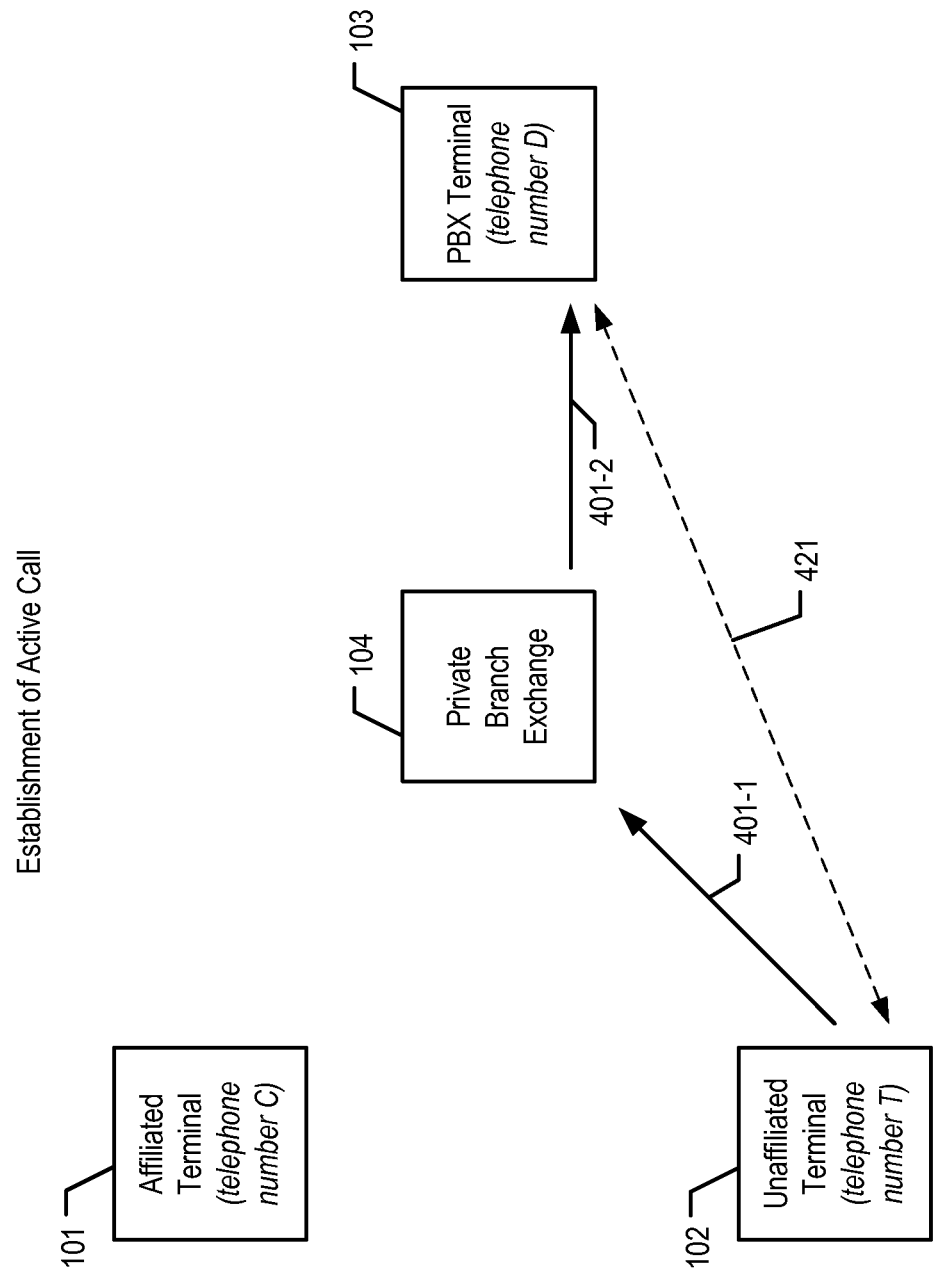

At task 301, CTI application 106 receives notification that an active call exists that includes telephone number D (i.e., that has D as a party to the call). FIG. 4a depicts a graph of the salient components of active call 421; in this example, active call 421 was placed from telephone number T to telephone number D and, as a result, comprises connections 401-1 and 401-2. After receiving the notification of the active call, application 106 notifies affiliated PSTN terminal 101 of the call. It will be clear to those skilled in the art how to make and use embodiments of the present invention that accomplish task 301.

At task 302, CTI application 106 receives a request from terminal 101, the affiliated PSTN terminal, to bridge the active call to telephone number C, a telephone number of terminal 101. For the purposes of this specification and the appended claims, the term "bridge" can mean either to join telephone number C to the call without dropping any of the parties already on the call or to transfer or switch the call to telephone number C, in the process dropping telephone number D from the call. As a result of receiving the request, application 106 directs private-branch exchange 104 to establish a first precursor call to telephone number D from a CTI port, and to enable the extending of the call to the telephone number of the affiliated PSTN terminal (i.e., telephone number C). The details of task 302 are described in detail below and in the accompanying figures.

In response to task 302, private-branch exchange 104 establishes at task 303 the first precursor call that includes telephone number D and telephone number C. FIG. 4b depicts a graph of the salient components of active call 421 and first precursor call 422, which comprises connections 402-1 and 402-2. The details of task 303 are described in detail below and in the accompanying figures.

At task 304, CTI application 106 directs private-branch exchange 104 to establish a second precursor call from telephone number D to port P. In accordance with the illustrative embodiment, task 304 is distinct from task 302. It will be clear to those skilled in the art, however, after reading this disclosure, how to make and use alternative embodiments of the present invention in which tasks 302 and 304 are combined or concurrent or performed in the opposite order. It will be clear to those skilled in the art how to make and use embodiments of the present invention that accomplish task 304.

Figure 4C:
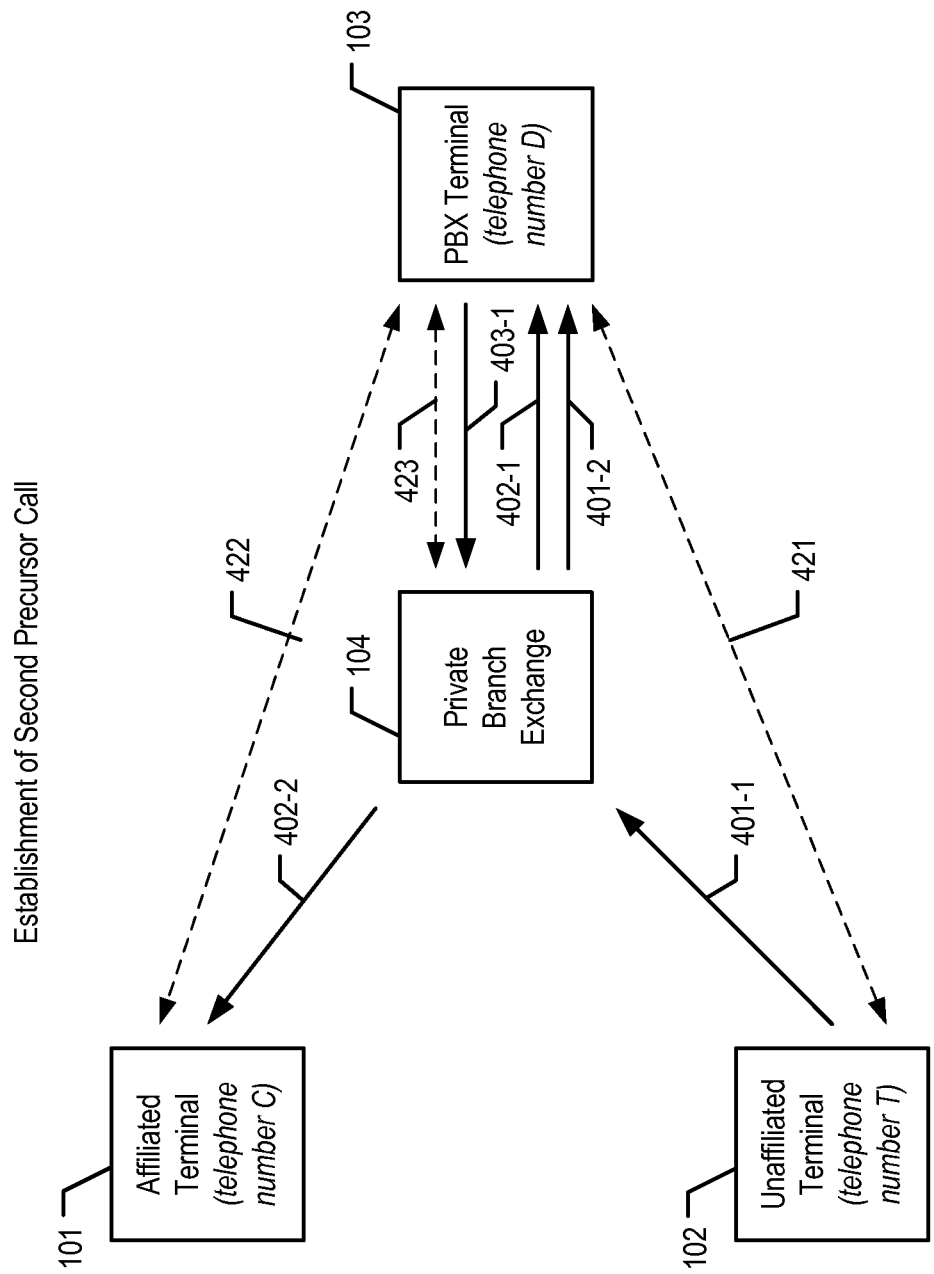

In response to task 304, private-branch exchange 104 establishes at task 305, the second precursor call from telephone number D to port P. FIG. 4c depicts a graph of the salient components of active call 421, first precursor call 422, and second precursor call 423, which comprises connection 403-1. In accordance with the illustrative embodiment, task 303 is performed before task 305. It will be clear to those skilled in the art, after reading this specification, how to make and use alternative embodiments of the present invention in which task 303 and task 305 are performed concurrently or in the opposite order. It will be clear to those skilled in the art how to make and use embodiments of the present invention that accomplish task 305.

At task 306, CTI application 106 directs private-branch exchange 104 to combine all three calls (i.e., one active and two precursor) to generate a resultant call between telephone number T and telephone number C while bridging telephone number D to the call. In accordance with the illustrative embodiment, task 306 is distinct from task 302 and task 304. It will be clear to those skilled in the art, after reading this disclosure, how to make and use alternative embodiments of the present invention in which task 302, task 304, and task 306 are combined or concurrent or performed in any order. It will be clear to those skilled in the art how to make and use embodiments of the present invention that accomplish task 306.

Figure 4D:
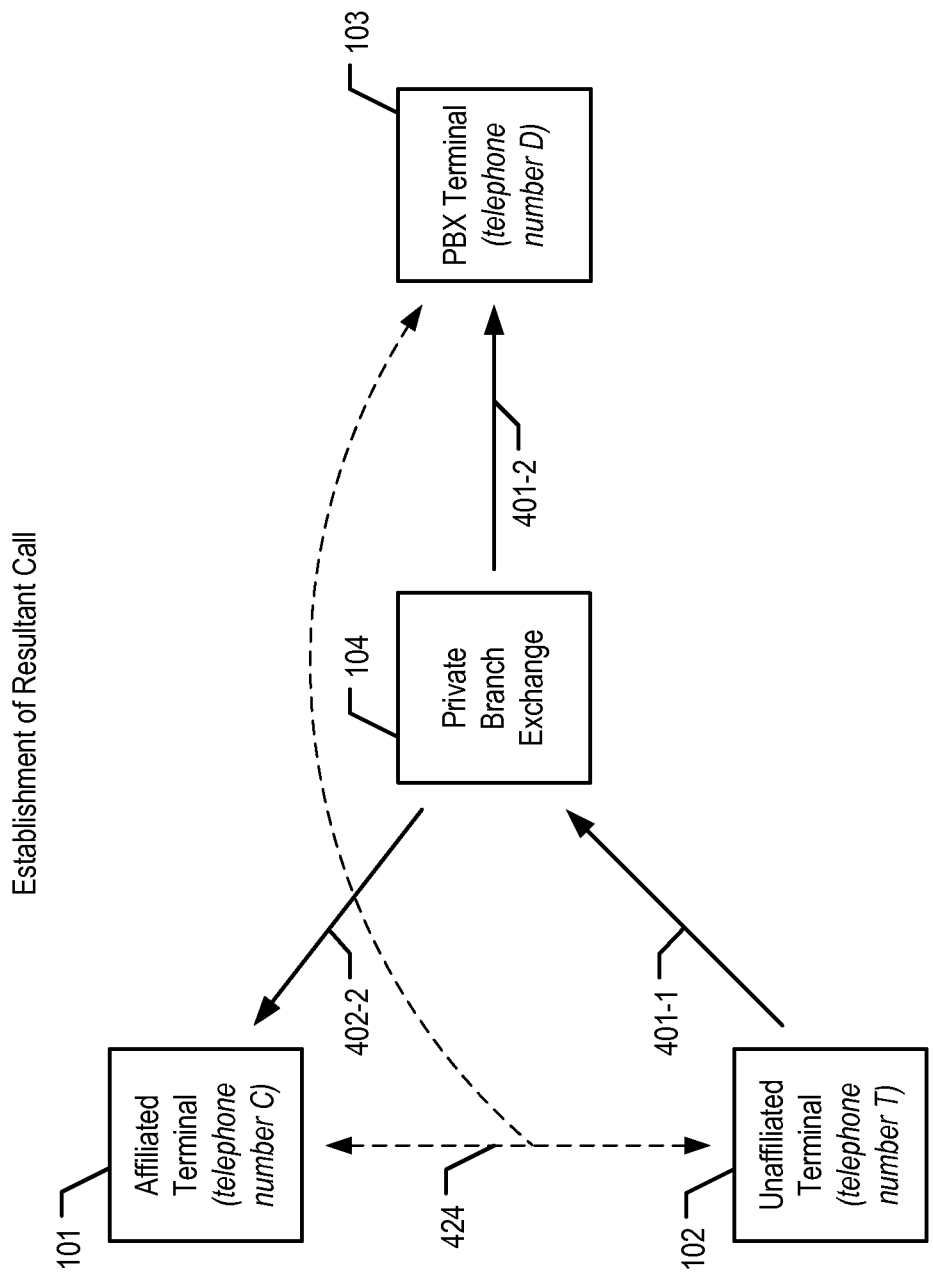

In response to task 306, private-branch exchange 104 combines, at task 307, all three calls to generate the resultant call between telephone number T and telephone number C while bridging telephone number D to the call. In accordance with the illustrative embodiment, the combination of the three precursor calls results in two-party resultant call 424 comprising connections 401-1, 401-2, and 402-2, as depicted in FIG. 4d. Task 307 is described in detail below and in the accompanying figures.

Notification of Active Call—

Figure 5:
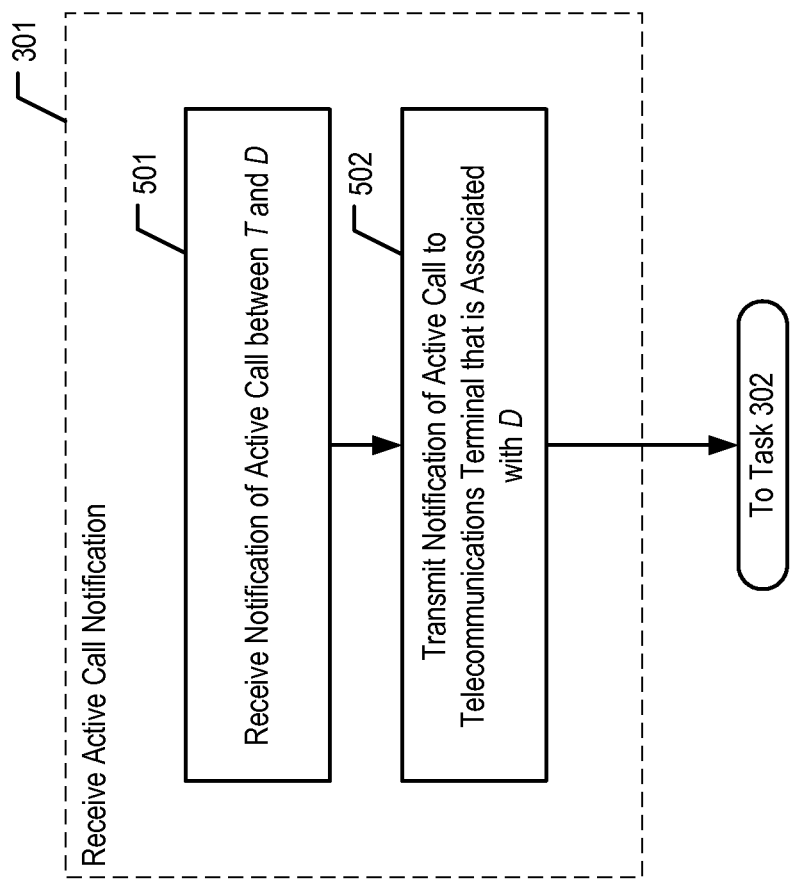
FIG. 5 depicts a flowchart of the salient task performed by the illustrative embodiment in accomplishing task 301.

FIG. 5 depicts a flowchart of the salient tasks performed by the illustrative embodiment in accomplishing task 301.

At task 501, CTI application 106 receives notification of an active call between telephone numbers T and D.

At task 502, CTI application 106, in response to having received the active-call notification, notifies the corresponding affiliated PSTN terminal (i.e., terminal 101) about the call.

Direct the Establishment of First Precursor Call—

Figure 6:
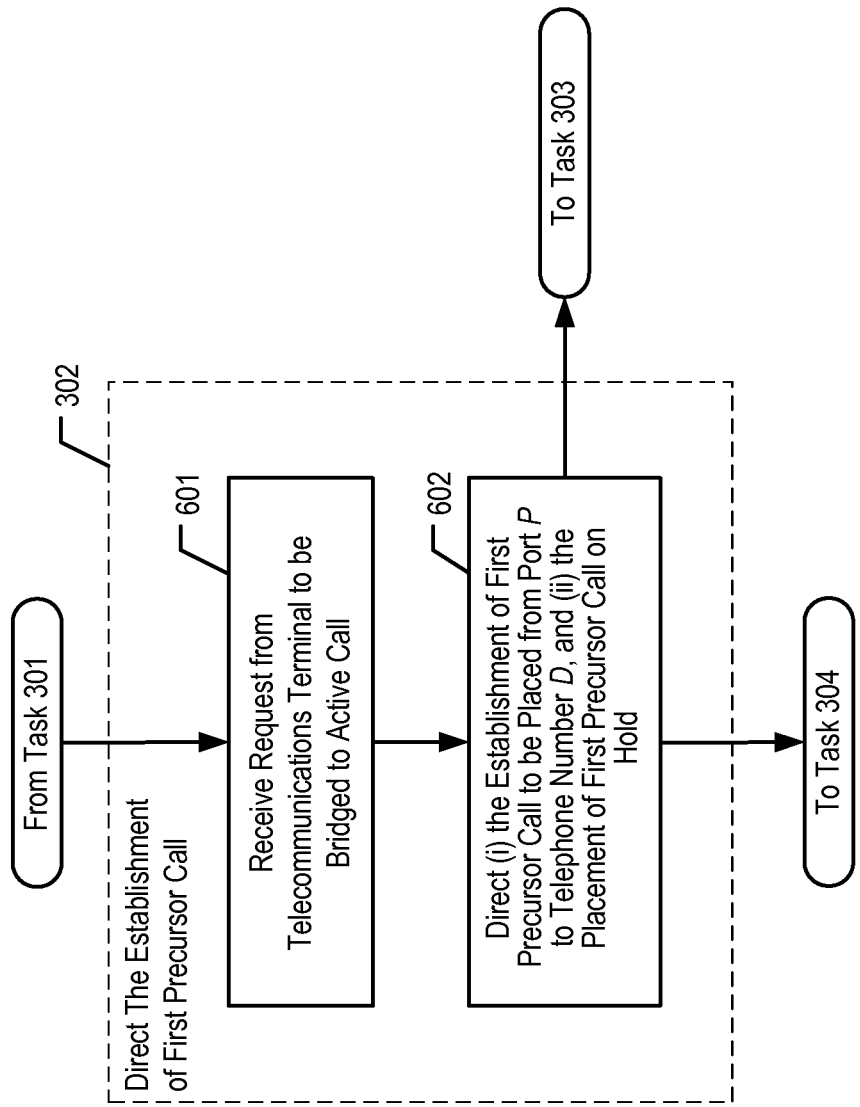
FIG. 6 depicts a flowchart of the salient tasks performed by the illustrative embodiment in accomplishing task 302.

FIG. 6 depicts a flowchart of the salient tasks performed by the illustrative embodiment in accomplishing task 302.

At task 601, CTI application 106 receives a request from the affiliated telecommunications terminal to be bridged to the active call. As those who are skilled in the art will appreciate, the terminal can transmit the request to application 106 either spontaneously or as the result of having received notification of the active call in conjunction with task 502.

At task 602, CTI application 106 determines that a port from pool 107, namely port P, is available to set up one or more precursor calls. Application 106 directs private-branch exchange 104 to: (i) enable a call made to telephone number D to be extended to the telephone number of the affiliated PSTN terminal (i.e., telephone number C); (ii) establish the first precursor call from selected port P to telephone number D; and (iii) place the first precursor call on hold. It will be clear to those skilled in the art how to make and use embodiments of the present invention that accomplish task 302.

In some embodiments, directing exchange 104 comprises transmitting one or more messages that: (i) direct the enabling of the extending of calls that are placed to telephone number D, to a telephone number of an affiliated terminal; (ii) direct the placing of the first precursor call; or (iii) direct the placing of the first precursor call on hold, or direct in some combination thereof.

Establish First Precursor Call—

Figure 7:
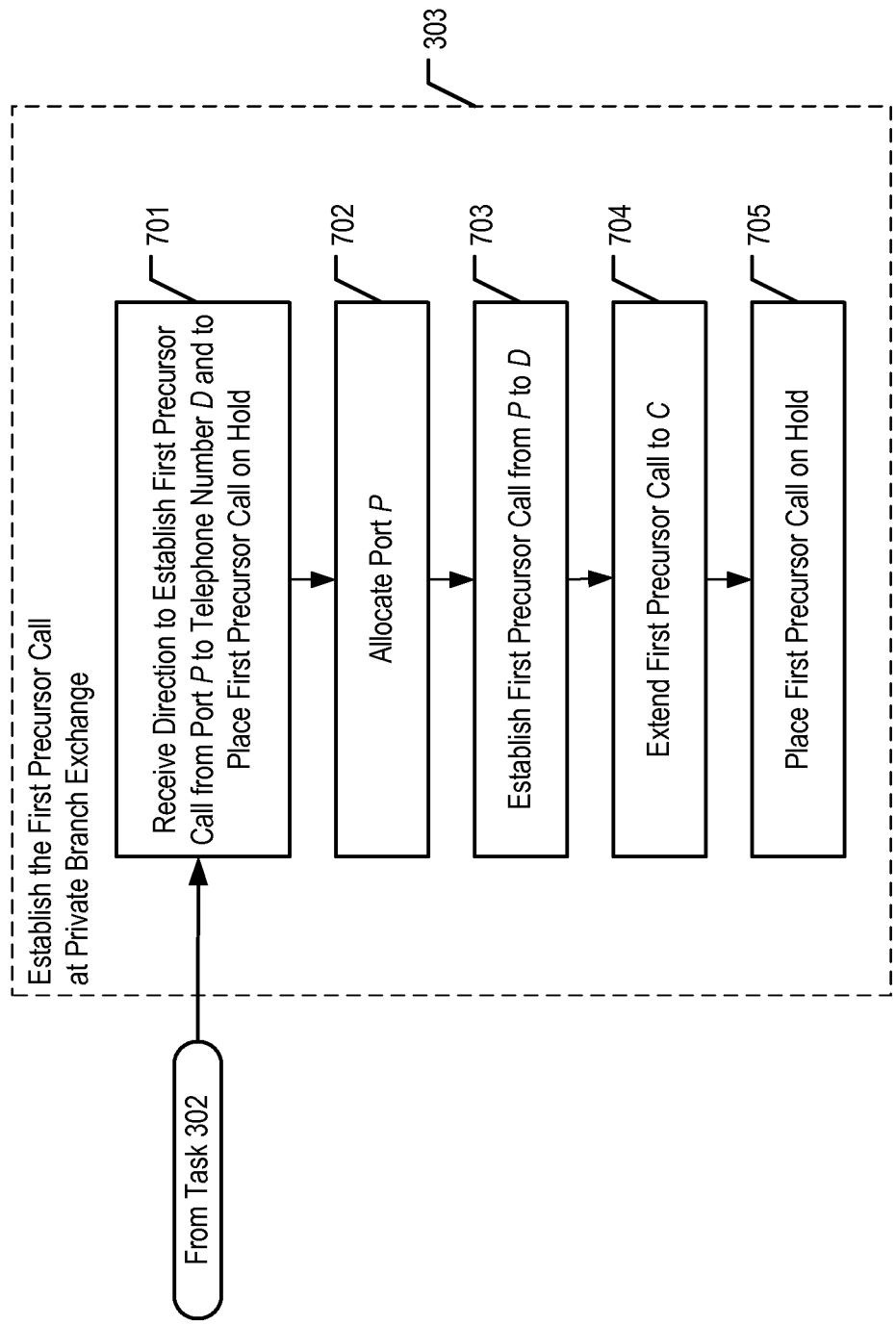
FIG. 7 depicts a flowchart of the salient task performed by the illustrative embodiment in accomplishing task 303.

FIG. 7 depicts a flowchart of the salient tasks performed by the illustrative embodiment in accomplishing task 303.

At task 701, private-branch exchange 104 is directed by CTI application 106, via one or more received messages, to establish a first precursor call from selected port P to telephone number D and to place the first precursor call on hold. In accordance with the illustrative embodiment, CTI application 106 directs private-branch exchange 104 to establish the first precursor call.

In some embodiments, the messages that exchange 104 receives comprise one or more messages that: (i) direct the enabling of the extending of calls that are placed to telephone number D, to a telephone number of an affiliated terminal; (ii) direct the placing of the first precursor call; or (iii) direct the placing of the first precursor call on hold, or direct in some combination thereof.

At task 702, private-branch exchange 104 allocates port P to be used for originating the call to telephone number D.

At task 703, private-branch exchange 104 enables the extending to telephone number C of one or more calls made to telephone number D. Exchange 104 then establishes the first precursor call from port P to telephone number D, in well-known fashion.

At task 704, in response to the call to telephone number D and to having enables the call extension capability, private-branch exchange 104 extends the first precursor call to telephone number C, in well-known fashion.

At task 705, private-branch exchange 104 places the first precursor call on hold, in well-known fashion.

Direct the Establishment of Second Precursor Call—

Figure 8:
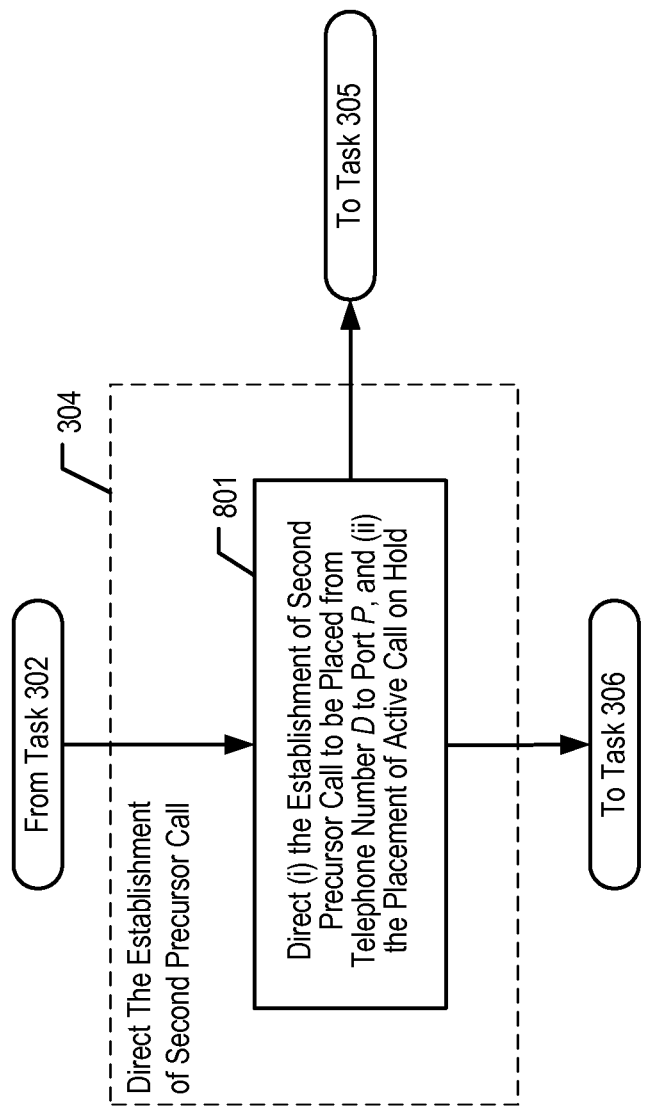
FIG. 8 depicts a flowchart of the salient task performed by the illustrative embodiment in accomplishing task 304.

FIG. 8 depicts a flowchart of the salient tasks performed by the illustrative embodiment in accomplishing task 304.

At task 801, CTI application 106 directs private-branch exchange 104 to establish a second precursor call from telephone number D to port P. It will be clear to those skilled in the art how to make and use embodiments of the present invention that accomplish task 304.

In some embodiments, directing exchange 104 comprises transmitting one or more messages that: (i) direct the placing of the active call on hold; (ii) direct the placing of the second precursor call; (iii) direct the answering of the second precursor call; or (iv) direct the placing of the second precursor call on hold, or direct in some combination thereof.

Establish Second Precursor Call—

Figure 9:
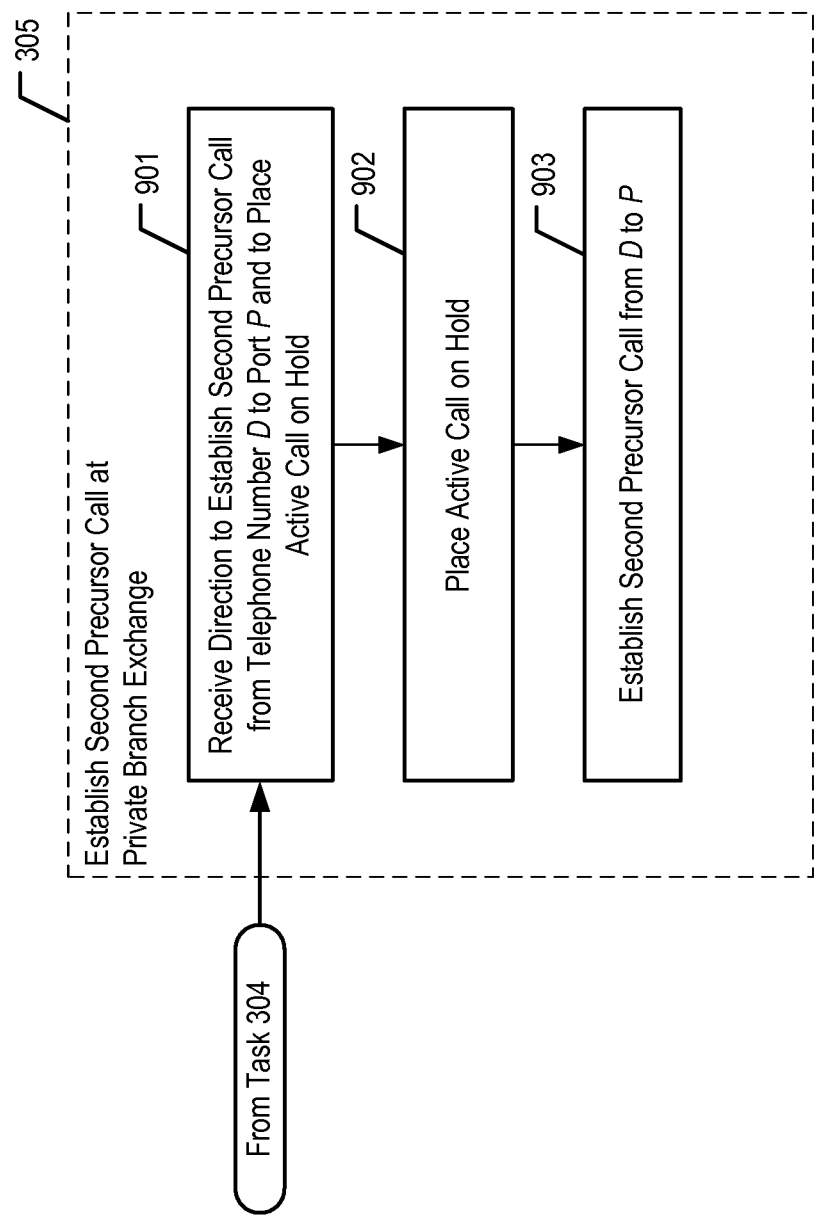
FIG. 9 depicts a flowchart of the salient task performed by the illustrative embodiment in accomplishing task 305.

FIG. 9 depicts a flowchart of the salient tasks performed by the illustrative embodiment in accomplishing task 305.

At task 901, private-branch exchange 104 is directed by CTI application 106 to establish a second precursor call from telephone number D to port P, in accordance with the illustrative embodiment.

In some embodiments, the messages that exchange 104 receives comprise one or more messages that: (i) direct the placing of the active call on hold; (ii) direct the placing of the second precursor call; (iii) direct the answering of the second precursor call; or (iv) direct the placing of the second precursor call on hold, or direct in some combination thereof.

At task 902, exchange 104 places the active call on hold.

At task 903, private-branch exchange 104 establishes the second precursor call from telephone number D to port P, in well-known fashion.

In some embodiments, exchange 104 then answers the second precursor call and places the precursor call on hold.

Combining the Calls—

Figure 10:
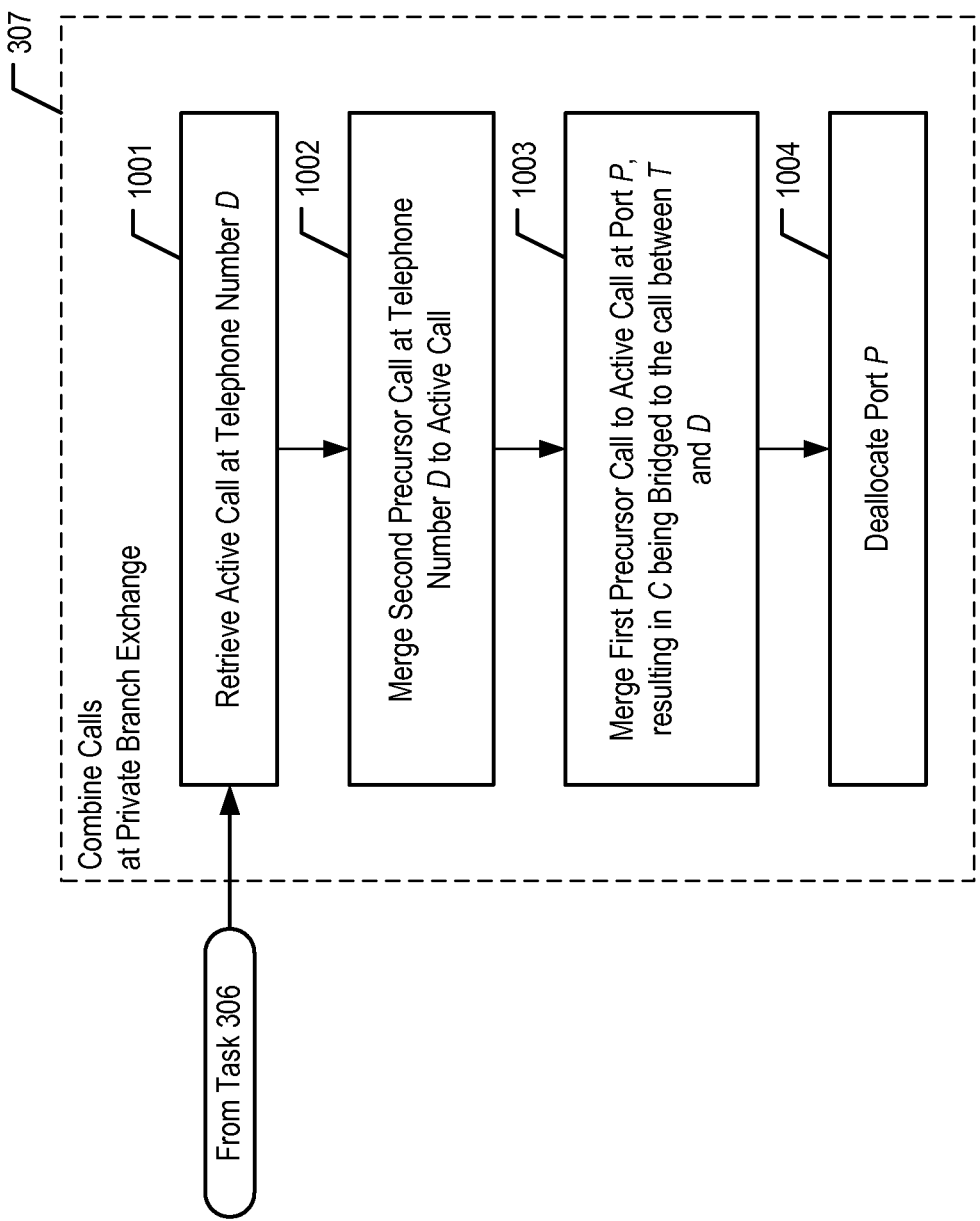
FIG. 10 depicts a flowchart of the salient task performed by the illustrative embodiment in accomplishing task 307.

FIG. 10 depicts a flowchart of the salient task performed by the illustrative embodiment in accomplishing task 307.

At task 1001, private-branch exchange 104 retrieves the active call (i.e., the call between telephone number T and telephone number D), in well-known fashion.

At task 1002, private-branch exchange 104 merges the second precursor call (i.e., from telephone number D to port P) with the active call at telephone number D, in well-known fashion.

At task 1003, private-branch exchange 104 merges the first precursor call (i.e., from port P to telephone number D, extended to telephone number C) with the already-merged active call (i.e., between telephone number T and port P), in well-known fashion; the effect of this is to create the resultant call. Exchange 104 then drops port P as a result of the merging.

At task 1004, private-branch exchange 104 deallocates port P, thereby enabling the port to be reused to support future calls that are controlled via CTI application 106.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising:

transmitting from an application server, a notification that an active call exists between a telephone number D and a telephone number T, wherein the notification is transmitted to a telephone number C;

receiving, at the application server, a request to bridge the active call to the telephone number C, wherein the request is transmitted from the telephone number C; and in response to receiving the request, bridging the active call by:

(i) allocating, from a pool of ports at a private-branch exchange, a port P that is capable of emulating a telephone extension, wherein the extension is known only to the application server and to the private branch exchange; and (ii) establishing a resultant call between the telephone number T and the telephone number C, the resultant call being based on the active call and on at least one precursor call having been made that includes port P, wherein establishing the resultant call comprises:

(1) enabling a capability that extends calls to the telephone number C that are placed to the telephone number D;

(2) directing a first precursor call to be established from the port P to the telephone number D;

(3) directing the active call to be placed on hold; and (4) directing a second precursor call to be established from the telephone number D to the port P;

wherein the telephone number C is associated with the telephone number D in a data structure and is within the address space of the Public Switched Telephone Network;

wherein the telephone number D is within the address space of a private-branch exchange; and wherein there are already established connections between the telephone number T and the private-branch exchange, and between the private-branch exchange and the telephone number D.

2. The method of claim 1 wherein establishing the resultant call comprises:

(1) establishing a first precursor call from the port P to the telephone number D; and (2) establishing a second precursor call from the telephone number D to the port P.

3. The method of claim 2 wherein establishing the resultant call further comprises extending the first precursor call to the telephone number C.

4. The method of claim 3 wherein establishing the resultant call further comprises combining the first precursor call and the second precursor call with the active call to generate the resultant call.

5. The method of claim 1 wherein establishing the resultant call comprises directing a first precursor call to be placed from the port P to the telephone number D.

6. The method of claim 5 wherein establishing the resultant call comprises extending the first precursor call to the telephone number C.

7. The method of claim 1 wherein establishing the resultant call further comprises:

directing the second precursor call to be transferred to the active call; and directing the first precursor call to be transferred to the active call to generate the resultant call.

8. The method of claim 1 further comprising placing the active call on hold.

9. A method comprising:

receiving, at an application server:

(1) a notification of an active call, which exists between a telephone number D and a telephone number T, wherein there are already established connections between the telephone number T and a private-branch exchange, and between the private-branch exchange and telephone number D, and (2) a request to bridge the active call to a telephone number C;

determining that a port P is available for use, wherein the port P is capable of emulating a telephone extension, and wherein the extension is known only to the application server and to the private branch exchange; and directing:
  (1) a first precursor call to be placed from the port P to the telephone number D,
  (2) the active call to be placed on hold at the telephone number D,
  (3) a second precursor call to be placed from the telephone number D to the port P, and
  (4) the first precursor call, the second precursor call, and the active call to be combined to generate a resultant call between the telephone number T and the telephone number C, wherein directing the first precursor call, the second precursor call, and the active call to be combined comprises directing:
    (4.1) the active call on hold to be retrieved at the telephone number D,
    (4.2) the second precursor call to be transferred to the active call, and
    (4.3) the first precursor call to be transferred to the active call to generate the resultant call.

10. The method of claim 9 wherein directing comprises the transmission of:
  a first message that directs the enabling of the extending of calls that are placed to the telephone number D, to a telephone number of an affiliated terminal;
  a second message that directs the placing of the first precursor call; and
  a third message that directs the placing of the first precursor call on hold.

11. The method of claim 10 wherein directing further comprises the transmission of:
  a fourth message that directs the placing of the active call on hold;
  a fifth message that directs the placing of the second precursor call;
  a sixth message that directs the answering of the second precursor call; and
  a seventh message that directs the placing of the second precursor call on hold.

* * * * *